Aug. 7, 1934.  L. J. SANDER  1,969,427
DUAL BACK WATER VALVE
Filed April 8, 1932
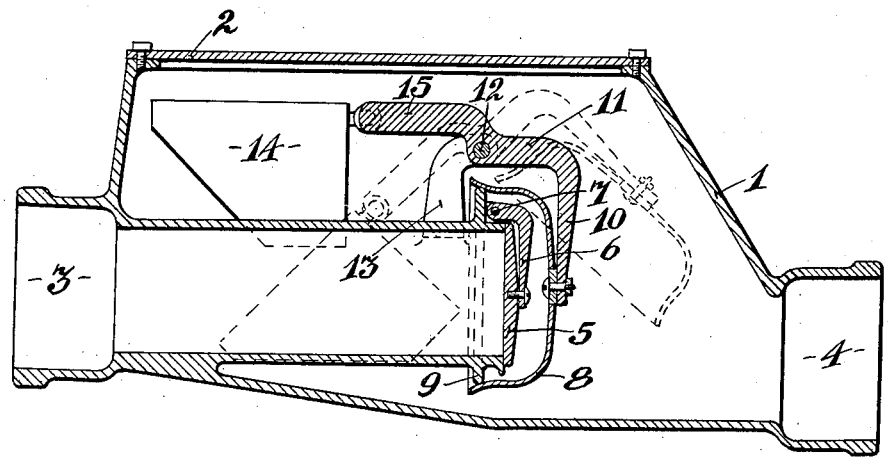
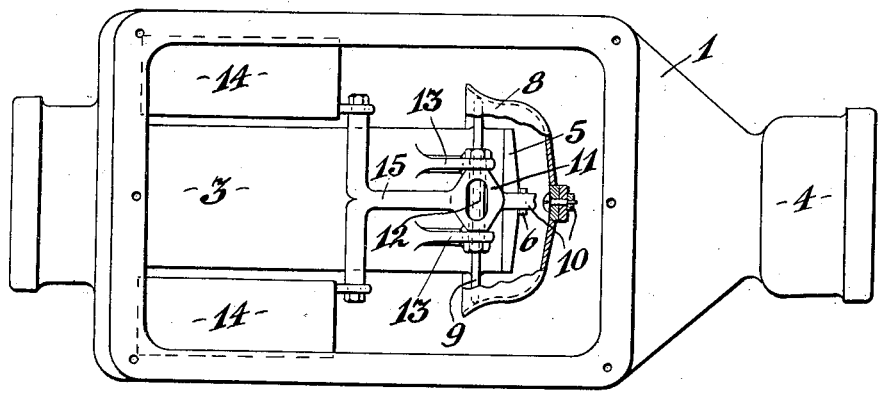
INVENTOR:
Louis J. Sander,
BY
Bodell & Thompson
ATTORNEYS.

UNITED STATES PATENT OFFICE 1,969,427

DUAL BACK WATER VALVE

Louis J. Sander, Buffalo, N. Y.

Application April 8, 1932, Serial No. 604,013

5 Claims. (Cl. 182—26)

This invention relates to dual back water valves, and has for its object a particularly simple and efficient construction and arrangement of the second valve by which it will seat and prevent back flow when the first of the valves is held open by the accumulation of debris, as leaves, sticks, etc., under its valve seat.

It further has for its object, a resilient, metal valve which can conform to its seat when held slightly out of alinement with its seat.

The invention consists in the novel features and in the combinations and constructions hereinafter set forth and claimed.

In describing this invention, reference is made to the accompanying drawing in which like characters designate corresponding parts in all the views.

Figure 1 is a longitudinal, vertical, sectional view of a dual back water valve embodying my invention.

Figure 2 is a plan view thereof, the cover of the receptacle being removed.

This back water valve comprises a suitable receptacle having an inlet and outlet, the inlet extending in a horizontal direction into the receptacle and terminating in an open pipe end, a gravity operated flap valve normally closing the pipe end, and a second valve which is bell shaped and encloses the former valve and the pipe end when closed, the second valve being resilient and capable of distortion to conform to its seat, regardless of whether the second valve is in exact alinement with the axis of the pipe end, and float operated means for normally holding the second valve open and closing it when water backs up, or fills into the receptacle.

1 designates the receptacle which is formed with a suitable removable top 2, an inlet 3, and an outlet 4, the inlet 3 extending horizontally into the receptacle and terminating in an open pipe end.

5 is a gravity operated flap valve preferably seating on the extreme end edge of the pipe end, this being carried by an angular lever 6 which is pivoted at 7 on the upper side of the pipe end, the lever being so arranged that the valve naturally falls into closed position.

8 is a second, or bell shaped valve, enclosing the pipe end and the flap valve 5, and seating at its margin on the edge of an annular flange 9 provided on the pipe end at a point spaced apart from the extreme end edge thereof. This bell shaped valve is formed of resilient metal, or at least, its margin is resilient in order to seat on the edge of the flange regardless of whether the axis of the valve is in exact alinement with the axis of the pipe end. The valve 8 is float operated, and is carried by the angular arm 10 of a lever 11 pivoted between its ends at 12 to a bracket 13 supported from the pipe end, the pivot 12 being located in the vertical plane of the flange 9 so that under ordinary conditions, the bell shaped valve 8, which is circular, will seat naturally, without distortion, on the circular edge of the flange 9.

14 is a float connected to the arm 15 of the lever. Preferably, the lever is bifurcated, and there is a float connected to each of the bifurcations thereof, the floats working on opposite sides of the inlet 3.

Normally in operation, water can flow through the inlet out through the outlet, the pressure thereof opening the flap valve. The valve 8 is normally held open by the float. When however, the water accumulates in the receptacle 1, or backs up thereinto through the outlet, the floats 14 are elevated, thus closing the valve 8. Usually, there are sticks, leaves, and other debris in the water which become lodged on the valve seat for the flap valve 5 and prevent it from seating, so that water backs up through the pipe end. When the water does accumulate in the receptacle 1 and the floats are lifted to their maximum extent, the force of the floats acting on the lever 11 will press the valve 8 toward its seat, and it will tend to conform to its seat, which is circular, even though leaves etc., may be accumulated therein and cause a slight misalinement of the valve and its seat, so that the valve 8 seats sufficiently tight under ordinary conditions to seal the pipe end against the backing up of water, even though the valve 5 is held off its seat. Furthermore, owing to the bell shaped valve, its movement toward closed position and compressing the water therein, tends to force the water over the edge of the flange 9 and clear it of any debris that may be adhering thereto. By reason of the valve 8 and its resiliency, the pipe end is sealed against backing up of the water, even though the flap valve 5 is held from seating.

What I claim is:

1. A back water valve comprising a receptacle having an inlet and outlet, the inlet extending in a horizontal direction into the receptacle and terminating in an open pipe end, a flap valve normally closing the pipe end and seating on the end edges thereof, a second valve, bell shaped in general form, enclosing the former valve and the pipe end, the pipe end having an annular seat for the second valve located at a point spaced from the end edge of the pipe end, and float operated means in the receptacle for closing the second valve.

2. A back water valve comprising a receptacle having an inlet and outlet, the inlet extending in a horizontal direction into the receptacle and terminating in an open pipe end, the pipe end having an annular flange at a point spaced apart from the end edge of the pipe end, a bell shaped valve enclosing the pipe end and seating on the edge of said flange, the valve being formed of resilient material whereby it conforms to the periphery of the flange when out of alinement, within limits, with the axis of the pipe end, a float operated means in the receptacle for closing the valve, and a flap valve pivoted to the pipe end at one end thereof and seating on the end edge of the pipe end, the flap valve being located within the bell shaped valve.

3. A back water valve comprising a receptacle having an inlet and outlet, the inlet extending in a horizontal direction into the receptacle and terminating in an open pipe end, the pipe end having an annular flange at a point spaced apart from the end edge of the pipe end, a bell shaped valve enclosing the pipe end and seating on the edge of said flange, the valve being formed of resilient material whereby it conforms to the periphery of the flange when out of alinement, within limits, with the axis of the pipe end, a lever carrying the valve, said lever being pivoted in the receptacle above and substantially in alinement with said flange, and having one arm angular and connected at its outer end to the valve, a float connected to the lever, and a flap valve pivoted to the pipe end at one side thereof and seating on the end of the pipe end and located within the bell shaped valve.

4. A back water valve comprising a receptacle having an inlet and outlet, the inlet extending in a horizontal direction into the receptacle and terminating in an open pipe end, a flap valve normally closing the pipe end and seating on the end edges thereof, a second valve, bell shaped in general form, enclosing the former valve and the pipe end, the pipe end having an annular seat for the second valve located at a point spaced from the end edge of the pipe end, and float operated means in the receptacle for closing the second valve, said second valve being formed with resilient material, whereby it conforms to said seat when out of alinement within limits with the axis of the pipe end.

5. A back water valve comprising a receptacle having an inlet and outlet, the inlet extending in a horizontal direction into the receptacle and terminating in an open pipe end, a check valve normally closing the pipe end, said pipe end being formed with a valve seat of greater diameter than the pipe end, and a float operated valve coacting with said seat and enclosing the pipe end, and operable to closed position by the raising of the float when water rises in the receptacle.

LOUIS J. SANDER.